(12) United States Patent
Deore et al.

(10) Patent No.: US 12,679,298 B2
(45) Date of Patent: Jul. 14, 2026

(54) BULL-BAR ASSEMBLY WITH ACCESS TO A VEHICLE COMPONENT

(71) Applicant: Toyota Motor Engineering & Manufacturing North America, Inc., Plano, TX (US)

(72) Inventors: Prashant K. Deore, Canton, MI (US); Christopher P. Sheehy, Ypsilanti, MI (US); Nora Arellano, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 18/443,457

(22) Filed: Feb. 16, 2024

(65) Prior Publication Data

US 2025/0263036 A1 Aug. 21, 2025

(51) Int. Cl.
    *B60R 19/52* (2006.01)
(52) U.S. Cl.
    CPC ........ *B60R 19/52* (2013.01); *B60R 2019/522* (2013.01)
(58) Field of Classification Search
    CPC ................................................ B60R 2019/522
    See application file for complete search history.

(56) References Cited

U.S. PATENT DOCUMENTS

| | | | |
|---|---|---|---|
| 4,127,295 A | 11/1978 | Robinson | |
| 6,290,271 B1 | 9/2001 | Geisler | |
| 7,090,267 B2 * | 8/2006 | Pendarvis | B60R 19/24 |
| | | | 293/133 |
| 2011/0006553 A1 | 1/2011 | Fretz et al. | |

* cited by examiner

*Primary Examiner* — Nicholas McFall
(74) *Attorney, Agent, or Firm* — Christopher G. Darrow; Darrow Mustafa PC

(57) ABSTRACT

Systems and other embodiments described herein relate bull-bar assemblies with an easy access latch. In one embodiment, a bull-bar assembly for a vehicle includes a panel defining a component aperture through which a vehicle component is accessible. The panel further defines a latch aperture. The bull-bar assembly also includes a cover attached to the panel and movable between a closed position, in which the cover blocks the component aperture, and an open position, in which the cover unblocks the component aperture. The bull-bar assembly further includes a latch accessible through the latch aperture and movable between an actuated position, in which the latch disengages the cover to unblock the component aperture, and an unactuated position, in which the latch engages the cover to block the component aperture.

10 Claims, 4 Drawing Sheets

BULL-BAR ASSEMBLY WITH ACCESS TO A VEHICLE COMPONENT

TECHNICAL FIELD

The subject matter described herein relates, in general, to bull-bar assemblies and, more particularly, to bull-bar assemblies that provide access to one or more vehicle components.

BACKGROUND

In some vehicles, vehicle accessories and/or components may be installed to the vehicle or housed within the vehicle in locations that are difficult for a user to access, for example, behind covers, within compartments, etc. In such circumstances, a user may need to carry spare tools that are required to access these components. For example, a user may need to carry a screwdriver or another hand tool that may be used to access such components. Such instances may require the user to carry these tools on their person or store them in the vehicle for later use. In instances in which the user does not have the tool, the user may not be able to access the vehicle component.

SUMMARY

In one embodiment, example systems relate to a bull-bar assembly for a vehicle. As mentioned above, vehicle components may be stored on the vehicle in locations that are difficult for a user to access. As a result, accessing vehicle components may require a user to carry hand tools or may require the installation of expensive closures that facilitate accessing and housing of vehicle components.

The embodiments described herein provide a latch mechanism for a bull-bar assembly that provides a cost-effective and user-friendly means for a user to access a vehicle component housed in the bull-bar assembly. In one arrangement, the bull-bar assembly includes, among other components of the bull-bar assembly, a panel that houses a vehicle component, for example, a winch for vehicle recovery.

The panel, in one embodiment, defines a component aperture through which a user can access the vehicle component. The bull-bar assembly also includes, in one arrangement, a cover that blocks the component aperture to respectively prevent dirt and debris from passing through the component aperture and contacting the vehicle component and to provide a user access to the vehicle component.

The bull-bar assembly, in one arrangement, further includes a latch that facilitates movement of the cover between an open position, in which the cover unblocks the component aperture to provide user access to the vehicle component, and a closed position, in which the cover blocks the component aperture. In one embodiment, the panel defines a latch aperture that provides user access to the latch through the panel in a similar way as the component aperture.

To prevent dirt and debris from entering the latch aperture, in one arrangement, the bull-bar assembly includes a grommet that blocks the latch aperture when installed to the panel. The grommet, when removed from the panel, provides user access to the latch. In this way, the user can engage the latch through the latch aperture to disengage the latch from the cover, which allows the cover to move to the open position away from the panel to provide access to the vehicle component through the component aperture.

In one arrangement, the latch is supported by and connected to a cross-member of the bull-bar assembly that provides lateral rigidity to the bull-bar assembly. Accordingly, the arrangements described herein have the benefit of providing a user-friendly, cost-effective bull-bar assembly that houses a vehicle component while also providing user access to the vehicle component using various apertures in the panel in conjunction with a latch.

In one embodiment, a bull-bar assembly for a vehicle includes a panel defining a component aperture through which a vehicle component is accessible. The panel further defines a latch aperture. The bull-bar assembly also includes a cover attached to the panel and movable between a closed position, in which the cover blocks the component aperture, and an open position, in which the cover unblocks the component aperture. The bull-bar assembly further includes a latch accessible through the latch aperture and movable between an actuated position, in which the latch disengages the cover to unblock the component aperture, and an unactuated position, in which the latch engages the cover to block the component aperture.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1A:
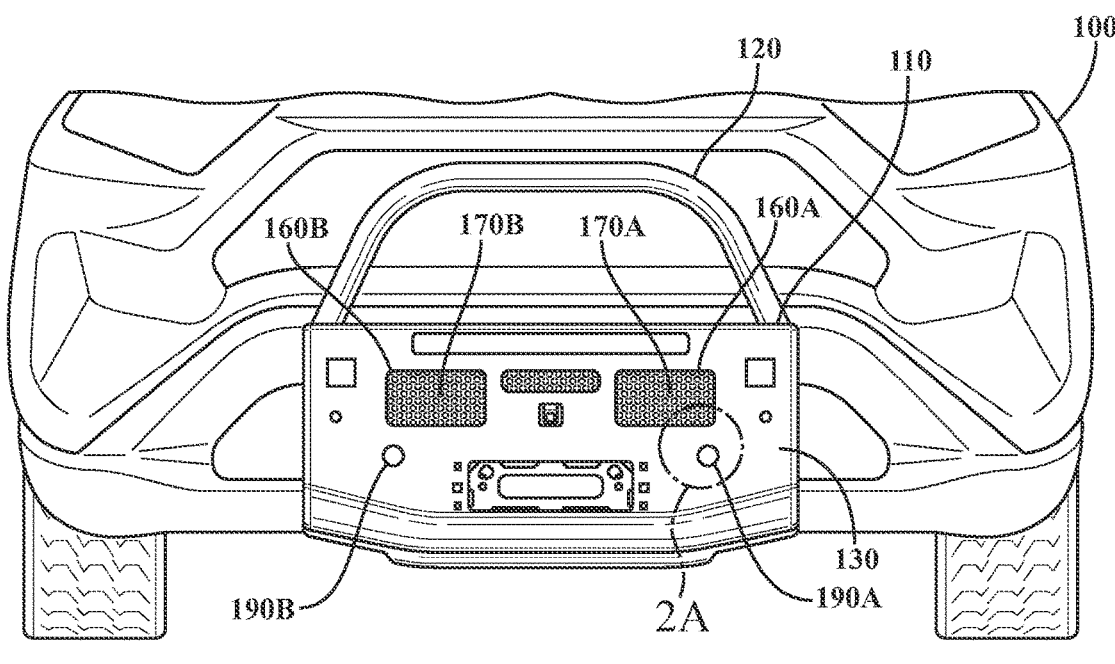
FIG. 1A illustrates one example of a bull-bar assembly for a vehicle.

Systems and other embodiments associated with a bull-bar assembly for a vehicle are disclosed. As mentioned above, vehicle components may be stored on the vehicle in locations that are difficult for a user to access. As a result, accessing vehicle components may require a user to carry hand tools or may require the installation of expensive closures that facilitate accessing and housing of vehicle components.

The embodiments described herein provide a latch mechanism for a bull-bar assembly that provides a cost-effective and user-friendly means for a user to access a vehicle component housed in the bull-bar assembly. In one arrangement, the bull-bar assembly includes, among other components of the bull-bar assembly, a panel that houses a vehicle component, for example, a winch for vehicle recovery. The panel, in one embodiment, defines a component aperture through which a user can access the vehicle component. The bull-bar assembly also includes, in one arrangement, a cover that blocks and unblocks the component aperture to respectively prevent dirt and debris from passing through the component aperture and contacting the vehicle component and to provide user access to the vehicle component.

The bull-bar assembly, in one arrangement, further includes a latch that facilitates movement of the cover between an open position, in which the cover unblocks the component aperture to provide user access to the vehicle component, and a closed position, in which the cover blocks the component aperture. In one embodiment, the panel defines a latch aperture that provides user access to the latch through the panel in a similar way as the component aperture.

To prevent dirt and debris from entering the latch aperture, in one arrangement, the bull-bar assembly includes a grommet that blocks the latch aperture when installed to the panel. The grommet, when removed from the panel, provides user access to the latch. In this way, the user can engage the latch through the latch aperture to disengage the latch from the cover, which allows the cover to move to the open position away from the panel to provide access to the vehicle component through the component aperture. In one arrangement, the latch is supported by and connected to a cross-member of the bull-bar assembly that provides lateral rigidity to the bull-bar assembly.

Accordingly, the arrangements described herein advantageously provide a bull-bar assembly with easy access to a vehicle component without the need for spare tools or an expensive closure. By way of the latch, the bull-bar assembly eliminates the need for a user to carry spare tools, such as a screwdriver, to access the vehicle component. Moreover, by way of the latch's integration with the existing structure of the bull-bar assembly, the arrangements described herein eliminate the need for a closure that is costly to manufacture and install to the vehicle. Therefore, the bull-bar assembly provides a system for improving accessing a vehicle component that is both cost-effective and user-friendly.

Turning now to FIG. 1A, part of a representative passenger vehicle 100 is shown. The vehicle 100 includes an exterior and a number of interior compartments. In one arrangement, the vehicle 100 includes a body that forms the exterior and defines or otherwise encloses the compartments. The body also includes a front fascia including a grille, headlights, a front bumper, and other components standard of vehicles. As described herein, the vehicle 100 also includes a bull-bar assembly 110. In one embodiment, the bull-bar assembly 110 includes various components that function together to serve multiple purposes in relation to the vehicle 100. For example, the various components, described in further detail below, function to protect the front fascia, especially the headlights, from front collisions. Moreover, as described herein, the components of the bull-bar assembly 110 are used as a platform for mounting various vehicle components, for example, a winch for vehicle recovery.

Figure 1B:
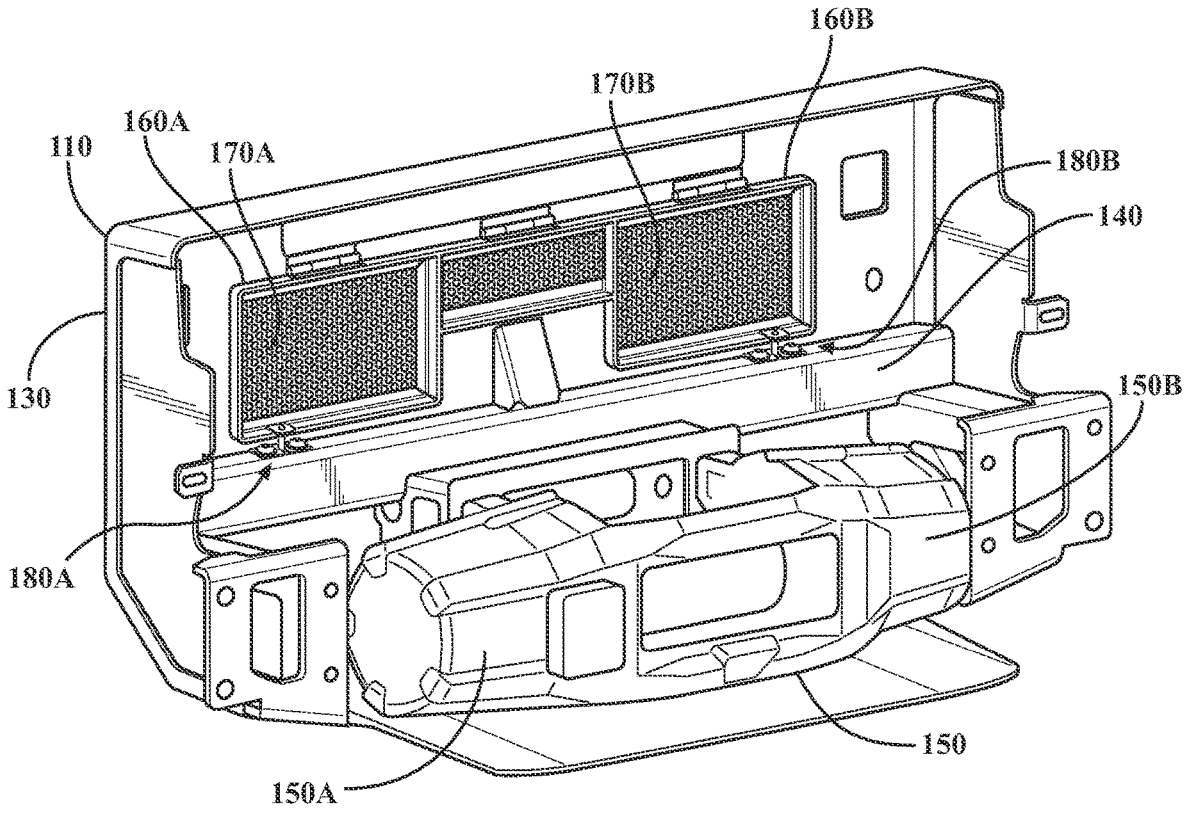
FIG. 1B illustrates one example of a vehicle component located behind the bull-bar assembly.

With continued reference to FIGS. 1A and 1B, the components of the bull-bar assembly 110 include, for example, a bull-bar 120, a panel 130, and a cross-member 140 connected to the panel 130 that provides structural, lateral rigidity and support to the bull-bar assembly 110. In one arrangement, the panel 130 houses and/or provides a mounting surface for one or more vehicle components 150. As shown in FIG. 1B, the vehicle components 150 are a winch 150A and a clutch 150B. However, it should be understood that the panel 130 may house one or more other vehicle components 150. In some instances, a person such as a user of the vehicle 100 or another user of the vehicle component 150 may need to access the vehicle component 150. For example, a vehicle 100 user or a tow truck operator may need to access the winch 150A for vehicle 100 recovery. While the remainder of this description references a single vehicle component 150, it should be understood that there may be two or more vehicle components housed behind the panel 130. Moreover, the vehicle component 150 need not be a vehicle 100 part. Rather, in some instances, the vehicle component 150 can be a control for the vehicle 100, such as a button or a lever used to operate a portion of the vehicle 100.

To provide access to the vehicle component 150, the panel 130 defines, in one example, component apertures 160. The component apertures 160 provide space to facilitate access to the vehicle component 150 by, for example, a person using one or more hands, tools, etc. As shown in FIGS. 1A and 1B, the panel 130 defines two component apertures 160: a first component aperture 160A and a second component aperture 160B. The first component aperture 160A and the second component aperture 160B provide access to two sides of the vehicle component 150. For example, the first component aperture 160A provides access to the winch 150A, while the second component aperture 160B provides access to the clutch 150B.

In some instances, dirt or other debris from a surrounding environment of the vehicle 100 may enter the component apertures 160, accumulate on the vehicle component 150, and cause deterioration or poor performance of the vehicle component 150. Accordingly, in one embodiment, the bull-bar assembly 110 includes covers 170 to protect the vehicle component 150 against dirt and/or debris entering through the component apertures 160. As shown in FIG. 1A, the bull-bar assembly 110 includes two covers 170: a first cover 170A corresponding to the first component aperture 160A and a second cover 170B corresponding to the second component aperture 160B. As described in further detail below, the covers 170 are movable between a closed position (shown in FIGS. 1A and 1B), in which the covers 170 block the component apertures 160, and an open position (described in further detail below), in which the covers 170 unblock the component apertures 160 to provide access to the vehicle component 150.

To facilitate movement of the covers 170 between the closed and open positions, the bull-bar assembly 110 further includes, in one embodiment, latches 180 that engage with the covers 170. For example, the bull-bar assembly 110 includes two latches: a first latch 180A provided for the first cover 170A and a second latch 180B provided for the second cover 170B. In one arrangement, the latches 180 are located behind the panel 130 and are accessible through the panel 130. The latches 180 will be described in further detail below.

As mentioned, the latches 180 are accessible through the panel 130. In other words, the latches 180 are located on a same side of the panel 130 as the vehicle component 150. Accordingly, in one embodiment, the bull-bar assembly 110 includes latch apertures 190 that provide access to the latches 180. As shown in FIG. 1A, the bull-bar assembly 110 includes two latch apertures: a first latch aperture 190A corresponding to the first latch 180A, the first cover 170A, and the first component aperture 160A and a second latch aperture 190B corresponding to the second latch 180B, the second cover 170B, and the second component aperture 160B. Accordingly, in the embodiment shown, the first latch 180A is accessible through the first latch aperture 190A to engage or disengage the first cover 170A to open or close the first component aperture 160A, and the second latch 180B is accessible through the second latch aperture 190B to engage or disengage the second cover 170B to open or close the second component aperture 160B.

While FIGS. 1A and 1B show two component apertures 160, two covers 170, two latch apertures 190, and two latches 180, it should be understood that the bull-bar assembly 110, in other embodiments, includes or otherwise defines a different number of these features. In one example, the bull-bar assembly 110 may define a single component aperture, latch aperture, cover, and latch to provide a single access point to the vehicle component 150. In other examples, the bull-bar assembly 110 can include or otherwise define more than two of each of the aforementioned features to provide more than two access points to the vehicle component 150. Moreover, the bull-bar assembly 110 does not need to include or otherwise define the same number of each feature. For example, it is contemplated that the bull-bar assembly 110 can define a single component aperture and a single cover but include multiple latches and define multiple latch apertures to facilitate opening and closing of the cover from multiple locations.

It should also be noted that, while FIGS. 1A and 1B show two groupings of a component aperture, a cover, and a latch aperture arranged in a substantially mirrored configuration, such features can take other arrangements as well and can be located with respect to the bull-bar assembly 110 in other locations. Moreover, for simplicity, the remainder of this description references the first component aperture 160A, the first cover 170A, the first latch 180A, and the first latch aperture 190A (hereinafter referred to respectively as the component aperture 160, the cover 170, the latch 180, and the latch aperture 190). It should be understood though, that in some embodiments, this description applies equally to the second component aperture 160B, the second cover 170B, the second latch 180B, and the second latch aperture 190B.

Figures 2A, 2B:
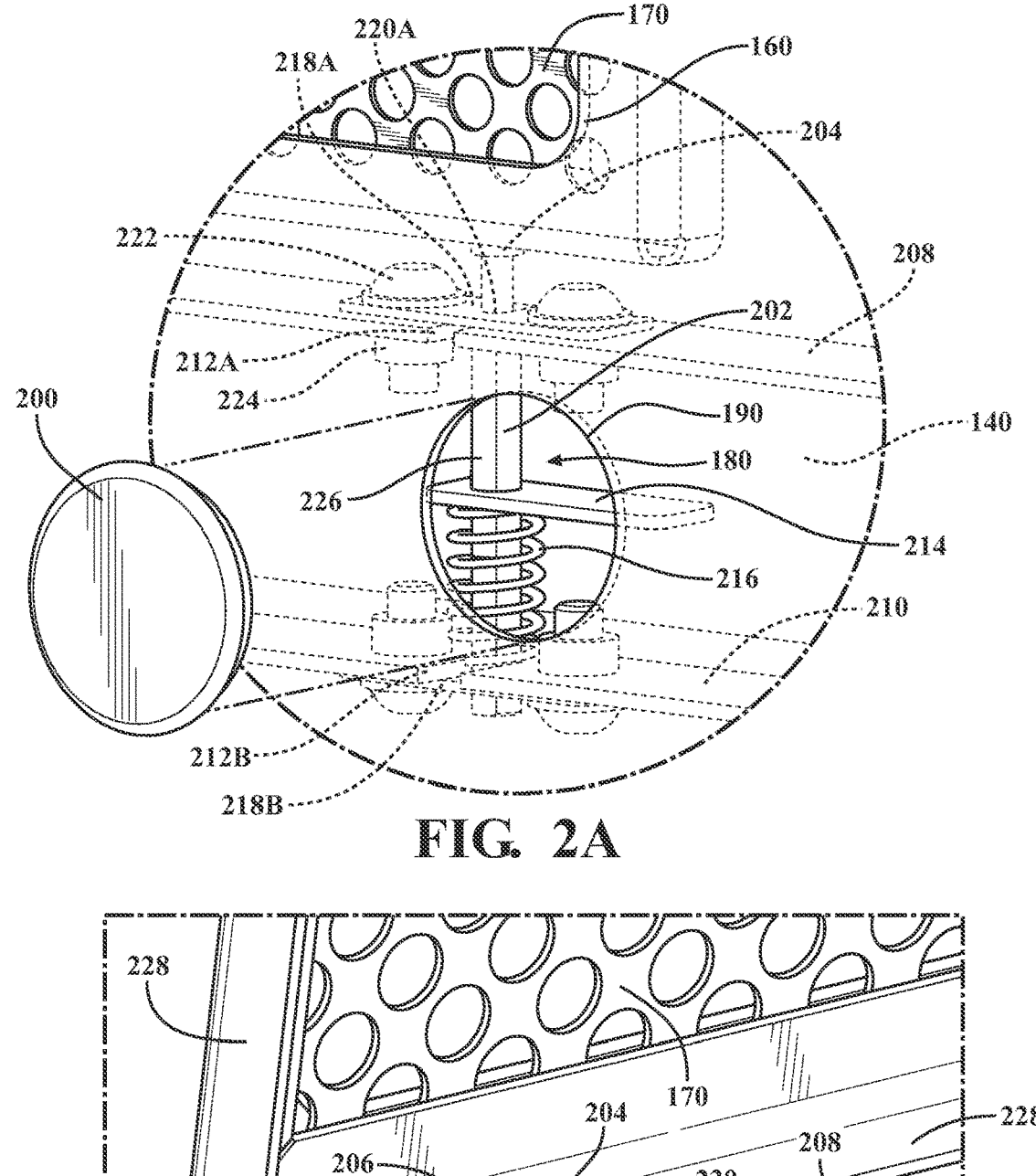
FIG. 2A illustrates one example of a close-up front view of a latch that unlatches a cover of the bull-bar assembly to provide access to the vehicle component.
FIG. 2B illustrates one example of a close-up rear view of the latch and the cover.

Referring now to FIG. 2A, a close-up view of a portion of FIG. 1A is shown. More specifically, FIG. 2A shows a view of the latch 180, the latch aperture 190, and portions of the cover 170 and the component aperture 160. As mentioned above, dirt and/or debris from the surrounding environment of the vehicle 100 may enter the component aperture and accumulate on the vehicle component 150. In a similar way, dirt and/or debris may also enter the latch aperture 190, accumulate on the latch 180, and damage or otherwise cause poor operation of the latch 180. Accordingly, in one embodiment, the bull-bar assembly 110 includes a grommet 200 that blocks the latch aperture 190 when not in use.

In one arrangement, the grommet 200 is a flexible, seal-like component that press-fits to the panel 130 to block the latch aperture 190. When the latch 180 needs to be accessed, the user can simply pull the grommet 200 off of the area of the panel 130 surrounding the latch aperture 190 to unblock the latch aperture 190. In other arrangements, the grommet 200 can take other forms suitable for blocking and unblocking the latch aperture 190. For example, the grommet 200 can instead be a cap, a seal, a sliding window, etc. Moreover, in some arrangements, the grommet 200 can unblock the latch aperture 190 without being fully removed from the panel 130. For example, the grommet 200 can be attached to the panel 130 by a hinge, a living hinge, a cord, etc. It should also be noted that while the latch aperture 190 and the grommet 200 have corresponding circular shapes, the latch aperture 190 and/or the grommet 200 can have other shapes as well. Moreover, the grommet 200 can be made from other materials, including substantially non-flexible materials, such as hard plastic, metal, etc. Additionally, it should be noted that the grommet 200 can attach to the panel 130, an area surrounding the panel 130, or other locations, as long as the grommet 200 blocks the latch aperture 190.

When the grommet 200 unblocks the latch aperture 190, the latch 180 is accessible by a user through the latch aperture 190. For example, a user can put a portion of his or her hand, for instance, a finger, through the latch aperture 190 to operate the latch 180 with his or her finger. As shown in FIG. 2A, the latch 180 includes various components that function together to facilitate movement of the cover to block and unblock the component aperture 160. More specifically, in one embodiment, the latch 180 includes a pin 202, a lever 214, and a spring 216, among other components described in further detail below.

Referring now to the pin 202, in one embodiment, the pin 202 defines an elongated, substantially cylindrical shape having a portion that engages the cover 170 to hold the cover 170 in the closed position against the panel 130. To engage the cover 170 and hold the cover 170 in a closed position, in one embodiment, the pin 202 includes a pin head 204 that engages the cover 170 through a pin aperture 206 (shown in FIG. 2B), as described in further detail below.

With continued reference to FIG. 2A, in one arrangement, the pin 202 is supported by the cross-member 140, for example, across the cross-member 140 substantially perpendicular to the cross-member 140. More specifically, in one example, the cross-member 140 includes an upper flange 208 and a lower flange 210 such that the cross-member 140 defines a substantially C-shaped cross section (in other words, in one example, the cross-member 140 is a C-channel rail). The upper flange 208 and the lower flange 210, in the example shown, define cross-member slots 212. More specifically, the upper flange 208 defines an upper cross-member slot 212A, and the lower flange 210 defines a lower cross-member slot 212B. The upper cross-member slot 212A and the lower cross-member slot 212B are, in one example, sized and shaped to receive the pin 202 such that the cross-member 140 holds the pin 202 in a substantially upright position.

As previously mentioned, the cross-member 140 is a component of the bull-bar assembly 110 that is typical of bull-bar assemblies. More specifically, the cross-member 140 provides structural rigidity to the bull-bar assembly 110. Accordingly, installing the latch 180 to the cross-member 140 facilitates the provision of a latch 180 for opening and closing the cover 170 while reducing costs associated with the latch 180, since the cross-member 140 is a preexisting structure for the bull-bar assembly 110. In other words, in the illustrated arrangement, there are no additional parts needed to install the latch 180 to the bull-bar assembly 110. In one embodiment, the only modification needed to install the latch 180 is to machine the cross-member slots 212 into the cross-member 140.

Referring now to the lever 214, in one embodiment, the lever 214 is provided on the pin 202 for actuation of the latch 180 by a user. In one instance, the lever 214 has a substantially flat, elongated shape that the user presses down on with a finger. Moreover, in one example, the lever 214 has a width that is greater than the diameter of the pin 202, which may ensure that the lever 214 has enough surface area for the user to comfortably press down on to actuate the latch 180. In one arrangement, the lever 214 extends from the pin 202 substantially perpendicular to the pin 202 such that, when the user presses down on the lever 214 in a direction that is substantially along an axis of the pin 202, the pin 202 moves down in the same direction to disengage the cover 170. In some instances, the lever 214 is formed as a component that is separate from the pin 202 and that is later attached to the pin 202 by adhesive, welding, etc. In other instances, the lever 214 and the pin 202 may be integrally formed as a unitary component, for example, by 3D-printing the lever 214 and the pin 202 together.

Referring now to the spring 216, in one embodiment, the spring 216 is provided around the pin 202 between the lever 214 and the lower flange 210 of the cross-member 140. Accordingly, the spring 216 biases the lever 214 to the unactuated position to keep the cover 170 in the closed position when the lever 214 is not engaged by a user. Thus, in the actuated position, the lever 214 is pressed down, the spring 216 compresses, and the latch 180 is moved to the actuated position. When the user no longer engages the lever 214, the spring 216 decompresses, the lever 214 is moved up, and the latch 180 returns to the unactuated position to hold the cover 170 in the closed position against the panel 130.

Moreover, in some instances, the spring 216 limits movement of the pin 202 in a downward direction. To limit movement of the pin 202 in the upward direction (e.g., to prevent the pin head 204 from damaging the cover 170), the pin 202 may define a larger diameter below the upper flange 208 of the cross-member 140. In this way, in one embodiment, the larger portion of the pin 202 abuts the upper flange 208 when the latch 180 is in the unactuated position so that the pin 202 cannot be moved up and potentially damage the cover 170.

In addition to moving up and down, in some instances, the pin 202 may be able to move along the cross-member slots 212, which may cause friction between the pin 202 and the cross-member 140, causing the components to wear. Moreover, if the pin 202 moves within the cross-member slots 212, the pin 202 may not be able to align correctly with respect to the cover 170 to hold the cover 170 in the closed position. Accordingly, in one embodiment, the latch 180 includes plates 218 that function to hold the pin 202 in place with respect to the cross-member slots 212 while allowing movement of the pin 202 in the up and down directions.

Examples of the plates 218 are shown in FIGS. 2A and 2B. As shown, in one arrangement, the plates 218 include an upper plate 218A and a lower plate 218B. The upper plate 218A and the lower plate 218B, in one example, include plate slots 220. As shown, the plate slots 220 include a first plate slot 220A and a second plate slot (not shown). The plate slots 220 are, in one embodiment, sized and shaped to receive the pin 202. Moreover, in the example shown, the upper plate 218A and the lower plate 218B are oriented such that the openings of the plate slots 220 face in a direction substantially opposite from the openings of the cross-member slots 212. More specifically, in one embodiment, the cross-member slots 212 have an arrangement in which openings of the cross-member slots 212 face away from the vehicle 100, while the plate slots 220 have openings facing toward the vehicle 100. In this way, the plate slots 220 and the cross-member slots 212 function together to retain the pin 202 within the cross-member 140.

The upper plate 218A, in one arrangement, rests against an outside surface of the upper flange 208, and the lower plate 218B, in one arrangement, rests against an outside surface of the lower flange 210. In another arrangement, though, the upper plate 218A may rest against an inside surface of the upper flange 208, and/or the lower plate 218B may rest against an inside surface of the lower flange 210. In either arrangement, or in other arrangements, the upper plate 218A and/or the lower plate 218B are connected to the cross-member 140 by bolts 222 and nuts 224, as shown in FIG. 2A. However, it should be understood that the upper plate 218A and/or the lower plate 218B can be connected to the cross-member 140 in other manners, for example, by adhesive, by welding, etc.

As mentioned above, in some instances, the pin 202 has a substantially cylindrical shape. Because of its cylindrical shape, the pin 202 may be susceptible to spinning within the cross-member slots 212 and/or the plate slots 220. This may cause wear and tear to the pin 202, the cover 170, the cross-member 140, and the plates 218. Accordingly, in one embodiment, the pin 202 has one or more features to limit its rotation within the cross-member 140 and the plates 218. For example, the pin 202 includes an anti-rotation step 226. In one arrangement, the anti-rotation step 226 is a flat portion of the pin 202 that contacts the upper plate 218A and/or the lower plate 218B to prevent the pin 202 from spinning within the plate slots 220. In some instances, the plate slots 220 may define a flat edge that aligns with the anti-rotation step 226 to prevent spinning of the pin 202.

Referring now to FIG. 2B, an example view of the pin 202 engaged with the cover 170 is shown. In one embodiment, the cover 170 defines an edge 228. The edge 228, in one example, extends substantially perpendicular to the cover 170 around at least a portion of a perimeter of the cover 170. In one arrangement, the edge 228 defines the pin aperture 206 through which the pin head 204 engages the cover 170 to hold the cover 170 against the panel 130 in the closed position. In some instances, the edge 228 may not be wide enough to reach the pin head 204 to facilitate closing of the cover 170. Accordingly, in another arrangement, for example, as shown in FIG. 2B, the cover 170 includes a tab 230. The tab 230 is, in one approach, connected to the edge 228, extends out from the edge 228, and includes the pin aperture 206 that engages the pin head 204. In some instances, it is advantageous to provide the tab 230 rather than extending the entire edge 228, as it reduces the amount of material, and thus cost, needed to make the cover 170.

Figure 3A:
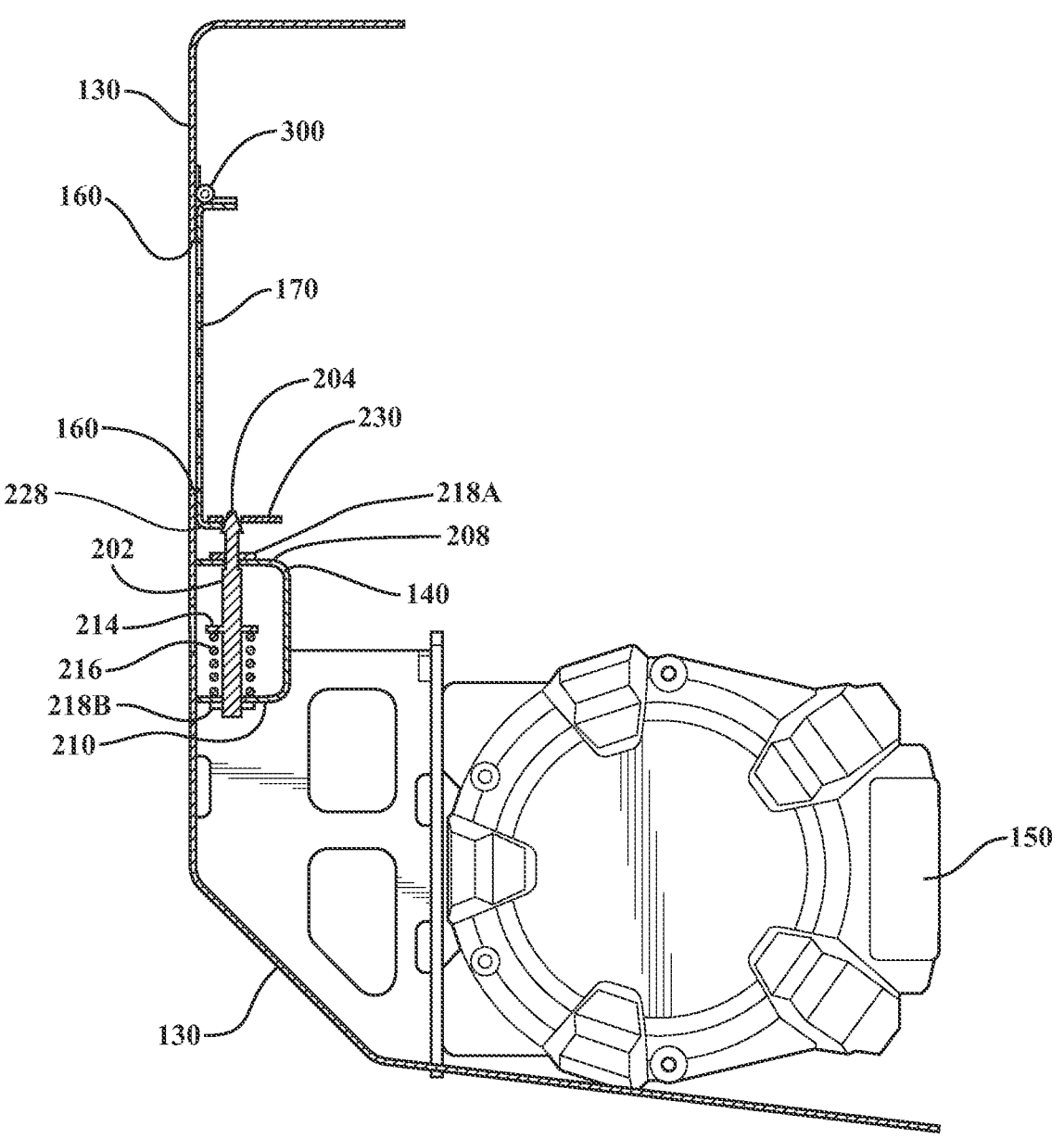
FIG. 3A illustrates one example of a side cross-sectional view of the bull-bar assembly with the cover in a closed position.
Figure 3B:
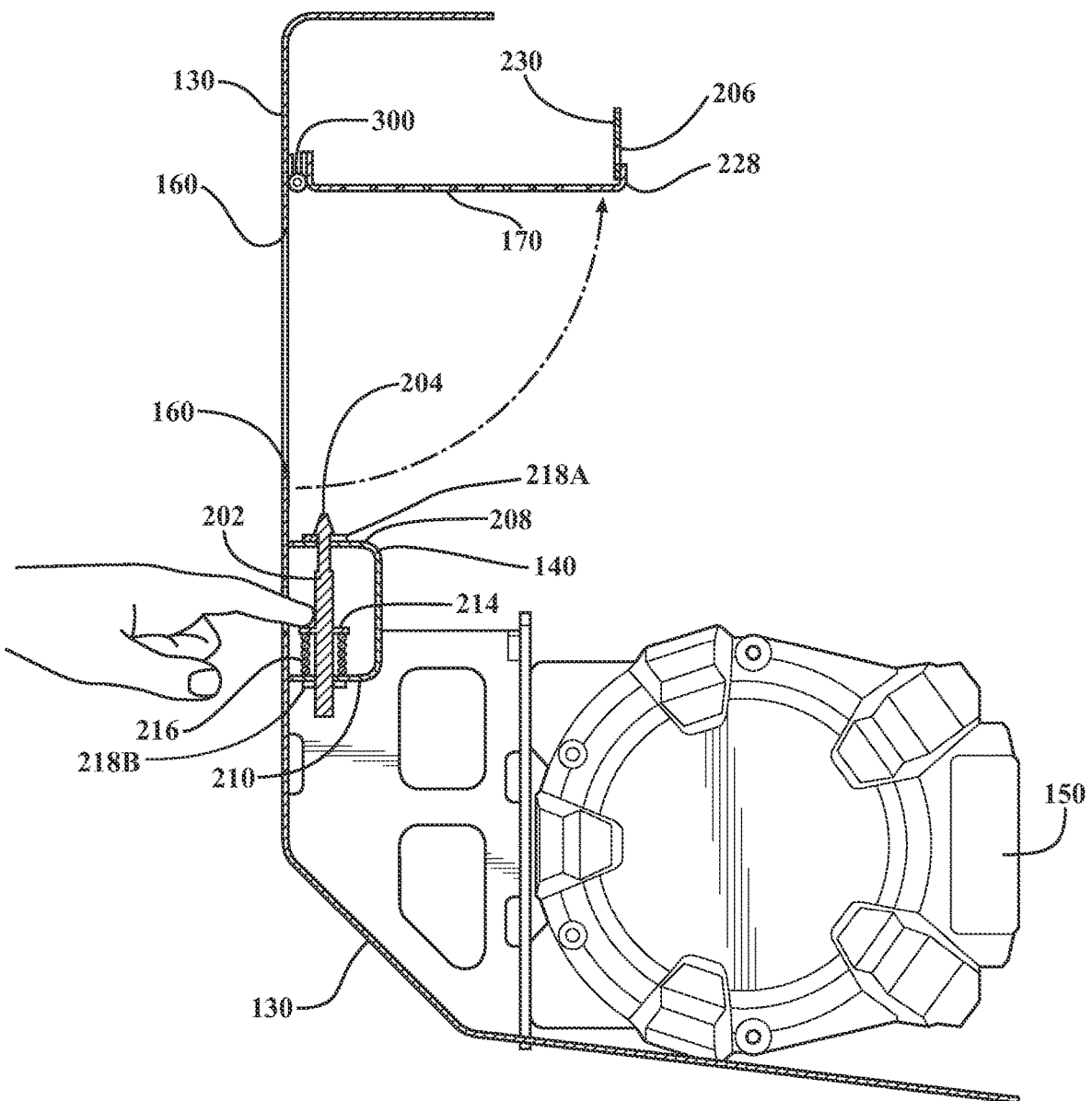
FIG. 3B illustrates one example of a side cross-sectional view of the bull-bar assembly with the cover in an open position to provide access to the vehicle component.

Referring now to FIGS. 3A and 3B, examples of a cross-sectional side view of the bull-bar assembly 110 are shown, depicting the cover 170 in the closed position and the latch 180 in the unengaged position (FIG. 3A) and the cover 170 in the open position and the latch 180 in the engaged position (FIG. 3B). As mentioned above, the cover 170 includes a pin aperture 206 through which the pin head 204 engages the cover 170 to hold the cover 170 against the panel 130 in the closed position. An example of the pin aperture 206 is shown in both FIGS. 3A and 3B. In one arrangement, the pin aperture 206 has a diameter greater than a tip of the pin head 204 but smaller than a base of the pin head 204. In other words, in some instances, the pin head 204 has a tapered shape that functions to self-align the pin head 204 within the pin aperture 206.

Moreover, as shown in FIGS. 3A and 3B, in one arrangement, the cover 170 is attached to a back side of the panel 130 by a hinge 300. The hinge 300, in one or more examples, is connected to the panel 130 and to the cover 170 to facilitate movement of the cover 170 away from the panel 130 in a direction toward the vehicle 100 to unblock the component aperture. In other examples, though, the cover 170 may be connected to a front side of the panel 130 such that when the latch 180 is engaged, the cover 170 is able to open in front of the panel 130 and in a direction away from the vehicle 100.

Referring now to FIG. 3A, an example of the latch 180 in an unactuated position is shown. In the unactuated position, the spring 216 biases the pin 202 to engage the pin head 204 with the pin aperture 206 and hold the cover 170 in the closed position against the panel 130. Referring now to FIG. 3B, an example of the latch 180 in the actuated position is shown. As mentioned above, a user can actuate the latch 180 to open the cover 170 by pressing down on the lever 214 with a finger. It should be noted that the user does not have to use a finger to actuate the latch 180. In other examples, the user can use multiple fingers, a portion of a hand, a tool, etc. to actuate the latch 180 and open the cover 170. As shown in FIG. 3B, when the latch 180 is in the actuated position, the lever 214 is moved downward, and the spring 216 is compressed. As the lever 214 moves downward, the pin 202 also moves downward, and the pin head 204 disengages the pin aperture 206, allowing the cover 170 to be moved to an open position.

In some instances, the cover 170 is moved to the open position (e.g., a user moves the cover 170 to the open position) by pushing the cover 170 in a direction toward the vehicle 100 (e.g., along a longitudinal axis of the vehicle 100 from the front to the back of the vehicle 100) with a hand, a finger, a tool, etc. When the cover 170 is in the open position, as shown in FIG. 3B, the cover 170 unblocks the component aperture to provide access to the vehicle component 150. As mentioned above, in one arrangement, the user accesses the vehicle component 150 through the component aperture. Accordingly, the component aperture can have a size that is suitable to provide hand space for the user to access the vehicle component 150. More specifically, in one example, the component aperture can have a size that is large enough for a user to pass a hand and, if needed, part of their arm, through the component aperture to access the vehicle component 150.

In some instances, the user may hold the cover 170 in the open position while accessing the vehicle component 150. In one instance, the user's arm holds the cover 170 in the open position while the user uses their hand to access the vehicle component 150. In another instance, the user can hold the cover 170 in the open position with one hand while using their other hand to access the vehicle component 150.

When the user no longer needs access to the vehicle component 150, the user can remove their hand, finger, and/or arm from the component aperture 160. Doing so allows the cover 170 to fall under its own weight and return to the closed position to block the component aperture 160. The user can then, in one embodiment, re-engage the latch 180 to allow the pin 202 to re-engage the pin aperture 206 to hold the cover 170 in the closed position against the panel 130.

While the description herein makes reference to a user, e.g., a human user of the bull-bar assembly, it should be understood that the user, in other instances, may be a non-human user such as a mechanical/robotic device.

As mentioned previously, the arrangements described herein have the benefit of providing a bull-bar assembly with easy access to a vehicle component without the need for spare tools or an expensive closure. By way of the latch, the bull-bar assembly eliminates the need for a user to use spare tools, such as a screwdriver, to access the vehicle component. Moreover, by way of the latch's integration with the existing structure of the bull-bar assembly, the arrangements described herein eliminate the need for a closure that is costly to manufacture and install to the vehicle. Therefore, the bull-bar assembly provides a system for accessing a vehicle component that is both cost-effective and user-friendly.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3B, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, OR ABC).

The term "substantially" and/or "about," as used herein, include exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degrees/percent/units or less. In some examples, "substantially" can include being within normal manufacturing tolerances.

In this description, uses of "front," "forward," and the like, and uses of "rear," "rearward," and the like, refer to the longitudinal directions of the vehicle. "Front," "forward," and the like refer to the front (fore) of the vehicle, while "rear," "rearward," and the like refer to the back (aft) of the vehicle. Uses of "side," "sideways," "transverse," and the like refer to the lateral directions of the vehicle. Uses of "above," "below," and the like refer to the vertical directions of the vehicle.

In this description, in one arrangement, the compartments of the vehicle include a passenger compartment, an engine compartment, a cargo area, and the like. Among other things, in one arrangement, the vehicle includes seats, a dash assembly, an instrument panel, controls, and the like housed in the passenger compartment. Additionally, in some instances, the vehicle may include an engine, a motor, a transmission, and the like, as well as other powertrain components, such as wheels, housed in the engine compartment and elsewhere in the vehicle. The wheels support the remainder of the vehicle on the ground. One, some or all of the wheels are powered by the remainder of the powertrain components to drive the vehicle along the ground.

Aspects herein can be embodied in other forms without departing from the spirit or essential attributes thereof. Accordingly, reference should be made to the following claims, rather than to the foregoing specification, as indicating the scope thereof.

What is claimed is:

1. A bull-bar assembly for a vehicle, comprising:
a panel defining a component aperture through which a vehicle component is accessible, the panel further defining a latch aperture;
a cover attached to the panel and movable between a closed position, in which the cover blocks the component aperture, and an open position, in which the cover unblocks the component aperture; and
a latch accessible through the latch aperture and movable between an actuated position, in which the latch disengages the cover to unblock the component aperture, and an unactuated position, in which the latch engages the cover to block the component aperture.

2. The bull-bar assembly of claim 1, wherein the vehicle component is a winch that is housed between the panel and the vehicle, wherein the latch is located on a same side of the panel as the winch, and wherein the component aperture and the latch aperture provide hand space for a user to respectively access the winch and the latch through the panel.

3. The bull-bar assembly of claim 1, further comprising a cross-member that provides lateral, structural support for the bull-bar assembly, the cross-member further defining flanges defining cross-member slots, and wherein the latch includes a pin that is received by the cross-member slots such that the cross-member supports the pin.

4. The bull-bar assembly of claim 3, further comprising plates having plate slots that retain the pin within the cross-member slots.

5. The bull-bar assembly of claim 1, wherein the latch includes:
a pin that engages the cover to hold the cover against the panel when the latch is in the unactuated position and that disengages the cover to allow the cover to open away from the panel when the latch is in the actuated position; and
a lever provided on the pin to facilitate movement of the pin between the unactuated position and the actuated position.

6. The bull-bar assembly of claim 5, further comprising a spring surrounding the pin between the lever and a cross-member to which the latch is installed, wherein the spring biases the pin to the unactuated position, and wherein the lever is moveable from the unactuated position to the actuated position when the lever is pressed and the spring is compressed.

7. The bull-bar assembly of claim 5, wherein the pin defines a pin head having a tapered shape, and wherein the cover defines a pin aperture that receives the pin head such that the pin head retains the cover against the panel in the closed position.

8. The bull-bar assembly of claim 7, wherein the cover defines an edge extending substantially perpendicular to the cover around at least a portion of a perimeter of the cover, and further comprising a tab extending from the edge and defining the pin aperture.

9. The bull-bar assembly of claim 5, wherein the pin defines an anti-rotation step that prevents the pin from rotating when the latch is installed to a cross-member of the bull-bar assembly.

10. The bull-bar assembly of claim 1, further comprising a grommet that attaches to the panel to block the latch aperture.

* * * * *